United States Patent
Gayrard et al.

(10) Patent No.: US 10,938,470 B2
(45) Date of Patent: Mar. 2, 2021

(54) STATION PLACED ON A HIGH-ALTITUDE PLATFORM AND TELECOMMUNICATIONS SYSTEM COMPRISING AT LEAST ONE SUCH STATION

(71) Applicant: THALES, Courbevoie (FR)

(72) Inventors: Jean-Didier Gayrard, Toulouse (FR); Per-Yann Le Roux, Toulouse (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 16/261,240

(22) Filed: Jan. 29, 2019

(65) Prior Publication Data

US 2019/0238215 A1 Aug. 1, 2019

(30) Foreign Application Priority Data

Feb. 1, 2018 (FR) ..................................... 18 00104

(51) Int. Cl.
*H04B 7/185* (2006.01)
*H04W 40/34* (2009.01)
(Continued)

(52) U.S. Cl.
CPC .......... *H04B 7/18504* (2013.01); *F01N 3/01* (2013.01); *H04B 10/1129* (2013.01);
(Continued)

(58) Field of Classification Search
CPC .... F01N 3/01; F01N 2570/10; F01N 2570/14; H04B 7/18504; H04B 10/1129;
(Continued)

(56) References Cited

U.S. PATENT DOCUMENTS

| | | | | | |
|---|---|---|---|---|---|
| 5,678,175 | A | * | 10/1997 | Stuart | H04B 7/195 244/158.4 |
| 7,831,251 | B2 | * | 11/2010 | Karabinis | H04B 7/18563 455/427 |
| 9,599,482 | B2 | * | 3/2017 | Maise | G08G 1/148 |
| 9,602,190 | B2 | * | 3/2017 | Keremedjiev | H04W 36/32 |

(Continued)

FOREIGN PATENT DOCUMENTS

WO 01/59961 A1 8/2001

OTHER PUBLICATIONS

Avdikos, et al., "Overview of the application of High Altitude Platform (HAP) systems in future telecommunication networks", 2008 10th International Workshop on Signal Processing for Space Communications, pp. 1-6, Oct. 6, 2008.

*Primary Examiner* — Abbas H Alagheband
(74) *Attorney, Agent, or Firm* — BakerHostetler

(57) ABSTRACT

A station placed on a high-altitude stationary platform includes two main emitter/receiver sets, each configured to establish a main communication link with a remote terminal station or with another station placed on a high-altitude stationary platform and two backup emitter/receiver sets, each configured to establish a backup communication link with a repeater placed on a relay station on the ground or at sea or with a remote terminal station, the station furthermore comprising a control facility configured to selectively activate a main communication link or a backup communication link as a function of an indicator of the operating state of the main communication link.

9 Claims, 12 Drawing Sheets

(51) Int. Cl.
*H04B 10/29* (2013.01)
*H04Q 11/00* (2006.01)
*H04B 10/112* (2013.01)
*F01N 3/01* (2006.01)

(52) U.S. Cl.
CPC ......... *H04B 10/29* (2013.01); *H04Q 11/0066* (2013.01); *H04W 40/34* (2013.01); *F01N 2570/10* (2013.01); *F01N 2570/14* (2013.01); *H04Q 2011/0073* (2013.01)

(58) Field of Classification Search
CPC .... H04B 10/29; H04B 10/118; H04B 10/516; H04B 7/185; H04B 7/18521; B01D 53/72; B01D 53/92; H04Q 11/0066; H04Q 2011/0073; H04W 40/34; G02B 6/293
USPC .................................................. 398/115, 121
See application file for complete search history.

(56) References Cited

U.S. PATENT DOCUMENTS

| | | | | |
|---|---|---|---|---|
| 10,225,011 | B1* | 3/2019 | Schubert | H04B 10/1121 |
| 2009/0028573 | A1* | 1/2009 | Krill | H04B 7/18508 |
| | | | | 398/125 |
| 2014/0376914 | A1* | 12/2014 | Miniscalco | H04B 7/18504 |
| | | | | 398/58 |
| 2015/0215039 | A1* | 7/2015 | Hastings, Jr. | H04B 10/112 |
| | | | | 398/128 |
| 2015/0295638 | A1* | 10/2015 | Keremedjiev | H04W 36/32 |
| | | | | 455/13.1 |
| 2015/0304885 | A1* | 10/2015 | Jalali | H04L 1/00 |
| | | | | 370/329 |
| 2018/0088280 | A1* | 3/2018 | Kim | G02B 6/29361 |
| 2018/0172915 | A1* | 6/2018 | Kim | G02B 6/29395 |
| 2018/0319495 | A1* | 11/2018 | Tu | H01Q 3/005 |
| 2019/0028197 | A1* | 1/2019 | Turner | H04B 10/118 |
| 2020/0059296 | A1* | 2/2020 | Regunathan | H04B 7/18519 |

* cited by examiner

STATION PLACED ON A HIGH-ALTITUDE PLATFORM AND TELECOMMUNICATIONS SYSTEM COMPRISING AT LEAST ONE SUCH STATION

CROSS-REFERENCE TO RELATED APPLICATIONS

This application claims priority to foreign French patent application No. FR 1800104, filed on Feb. 1, 2018, the disclosure of which is incorporated by reference in its entirety.

FIELD OF THE INVENTION

The field of the invention is that of high-bitrate low-latency links for enabling two mutually remote terminal stations situated at two points of the Earth to communicate. For example, the invention applies in respect of the establishment of a low-latency point-to-point bidirectional link between two financial hubs of the globe. In the field of exchanges between financial or stock-market hubs, the latency of the communications is a significant parameter. The invention also applies to the field of aircraft surveillance or maritime surveillance.

BACKGROUND

The invention relates more precisely to a telecommunications system comprising several stations placed on high-altitude stationary platforms complemented by repeaters placed in relay stations situated on the ground or at sea.

An objective envisaged by the invention is to design a low-latency digital communication link between two mutually remote terminal stations situated at two mutually remote points of the terrestrial globe, separated, for example, by a continent or by an ocean.

A known solution making it possible to produce such a point-to-point communication link consists in deploying optical fibres. However, this technology does not make it possible to achieve the low latencies required notably for applications in the financial field.

For this reason, another known solution consists in using stations placed on high-altitude platforms or HAPS (standing for High Altitude Platform Station) which are linked in series to establish a link between two points of the globe.

Notably, the solution described in U.S. Pat. No. 9,602,190 is known, which discloses a link between two terminal stations which is composed of several high-altitude platforms in series. The platforms communicate with one another by radiofrequency links. Satellites can also replace certain platforms.

A drawback of this first solution is that the radiofrequency links can only be established between two stations in direct visibility of one another. A long-distance link therefore requires a large number of relay stations placed on high-altitude platforms, this exhibiting significant installation and maintenance costs.

Moreover, radiofrequency links may be disturbed or attenuated in case of poor weather conditions, notably during rain events. The attenuations caused by atmospheric water vapour and precipitations are particularly strong at frequencies greater than 30 GHz (frequencies in the EHF band). To circumvent the attenuations due to rain, the bottommost point of a radiofrequency link must be above the altitude of the zero degrees Celsius isotherm (or above the altitude atop the rain). The 0° isotherm rises to altitudes of around 5 km in the intertropical regions, thus reducing the "radio" operational visibility distance between two stations placed on a high-altitude platform to less than 875 km.

Also known is the solution described in U.S. Pat. No. 9,215,008, which discloses a similar system based on non-stationary platforms and laser links between each station. Laser links exhibit the drawback of being sensitive to disturbances related to clouds which may block transmission of the infrared light of the laser. Thus, the use of laser links exhibits the drawback of reduced range and therefore requires a large number of platforms in order to minimize the distance between two platforms so as to have an acceptable visibility distance. Certain clouds rise to altitudes of beyond 12 km, thus reducing the visibility distance of a laser link between two stations placed on a high-altitude platform to less than 640 km.

The invention solves the limitations of the aforementioned solutions of the prior art through the implementation of a low-latency digital communication link composed of stations placed on high-altitude platforms and of repeaters placed in relay stations disposed on the ground or at sea at equal distance from two successive platforms. Each station placed on a high-altitude platform is configured to selectively activate a direct link with a neighbouring platform or a backup link with a repeater placed in a relay station when the weather conditions do not allow the use of the direct link.

SUMMARY OF THE INVENTION

The subject of the invention is thus a station placed on a high-altitude stationary platform comprising two main emitter/receiver sets, each configured to establish a main communication link with a remote terminal station or with another station placed on a high-altitude stationary platform and two backup emitter/receiver sets, each configured to establish a backup communication link with a repeater placed on a relay station on the ground or at sea or with a remote terminal station, the station furthermore comprising a control facility configured to selectively activate a main communication link or a backup communication link as a function of an indicator of the operating state of the main communication link.

According to a particular aspect of the invention, the control facility comprises a device for measuring an indicator of the operating state of the main communication link and the station comprises a selection device configured to activate a backup communication link when the operating state of a main communication link is degraded.

According to a particular aspect of the invention, the indicator of the operating state of the main communication link depends on the meteorological conditions.

According to a particular aspect of the invention, the main communication link is an optical link.

According to a particular aspect of the invention, the backup communication link is a radiofrequency link.

According to a particular embodiment, the station placed on a high-altitude stationary platform according to the invention comprises at least one emitter/receiver set configured to establish a third communication link with an aircraft or a ship.

The subject of the invention is also a system for telecommunications between a mutually remote first terminal station and a second terminal station, comprising at least two stations placed on high-altitude stationary platforms according to one of the preceding claims and at least one repeater placed on a relay station on the ground or at sea and configured to relay the communications between two stations placed on high-altitude stationary platforms.

According to a particular aspect of the invention, the distance between two high-altitude stationary platforms is determined on the basis of two predetermined respective angles of elevation between the relay station and the two respective platforms, the angles of elevation being predetermined as a function of the geographical environment of the repeater.

BRIEF DESCRIPTION OF THE DRAWINGS

Other characteristics and advantages of the present invention will become better apparent on reading the description which follows in relation with the appended drawings which represent.

DETAILED DESCRIPTION

Figure 1A:
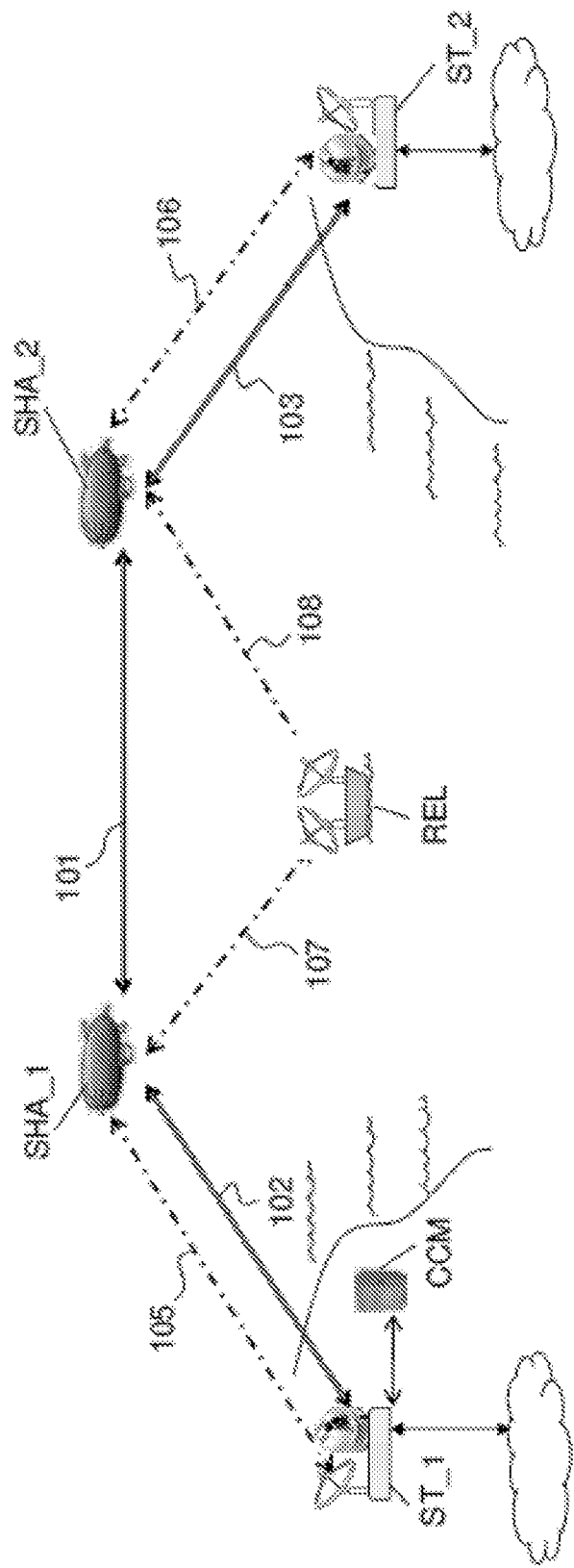
FIG. 1A depicts a diagram of an exemplary telecommunication system according to a first embodiment of the invention.

FIG. 1A represents a diagram of a telecommunication system according to a first embodiment of the invention. This system comprises several stations placed on high-altitude stationary platforms SHA_1,SHA_2 and arranged in series so as together to form a point-to-point communication link between a first terminal station and a second terminal station ST_1,ST_2.

The term "station" or "communication station" designates a station comprising one or more emitters or receivers, or a set of emitters and of receivers, including the accessory apparatus, necessary to ensure a communication service at a given location.

The term "relay station" designates a station comprising one or more repeaters relaying in both directions of communication the signals coming from other communication stations.

A station placed on a high-altitude platform or HAPS (High Altitude Platform Station) designates a station installed on an object placed at a high altitude, for example above 18 km and at a specified, nominal, fixed point relative to the Earth.

A high-altitude stationary platform SHA_1,SHA_2 is, for example, an aerostat. It is provided with propulsion means, typically a motor, allowing it to compensate for the force of the winds so as to remain stationary around a specified, nominal, fixed point relative to the Earth. By stationary is meant here a positioning of the platform which is fixed relative to a point situated on the ground or, more generally, a platform displacement limited to a restricted zone, a few kms in diameter, centred on a fixed point.

Although two platforms SHA_1,SHA_2 are represented in FIG. 1A, a real telecommunications system generally comprises more than two platforms so as to be able to construct a communication link between two mutually remote points of the globe several thousand km apart.

The system according to the first embodiment of the invention furthermore comprises at least one repeater placed in a relay station REL disposed between two neighbouring platforms SHA_1,SHA_2. The relay station REL is disposed on the ground or at sea. When it is positioned on the Earth, a relay station REL is, for example, disposed on a pylon or on a high point. When it is positioned at sea, a relay station REL is disposed on a floating craft, for example a buoy. The floating craft on which the relay station is disposed comprises means for remaining stationary around a fixed and specified point. These means may be for example motors with propellers or a permanent anchor.

Each station placed on a high-altitude stationary platform SHA_1,SHA_2 comprises means for establishing a main bidirectional link with another station placed on a neighbouring platform or with a terminal station. This link 101, 102,103 is, for example, a laser communication link or a free space optical link.

Each station placed on a high-altitude stationary platform SHA_1,SHA_2 also comprises means for establishing a backup bidirectional link 107,108 with a repeater placed in a relay station REL. The backup link 107,108 is a radiofrequency link, for example in the EHF frequency band.

Moreover, each station placed on a high-altitude stationary platform SHA_1,SHA_2 is also configured to establish a backup bidirectional link 105,106 with a terminal station ST_1,ST_2, the backup link being a radiofrequency link of the same nature as the backup link between a station SHA_1,SHA_2 and a repeater placed in a relay station REL.

At least one terminal station ST_1 is linked to a command and control centre CCM configured to parametrize the telecommunications system according to the invention.

Figure 2:
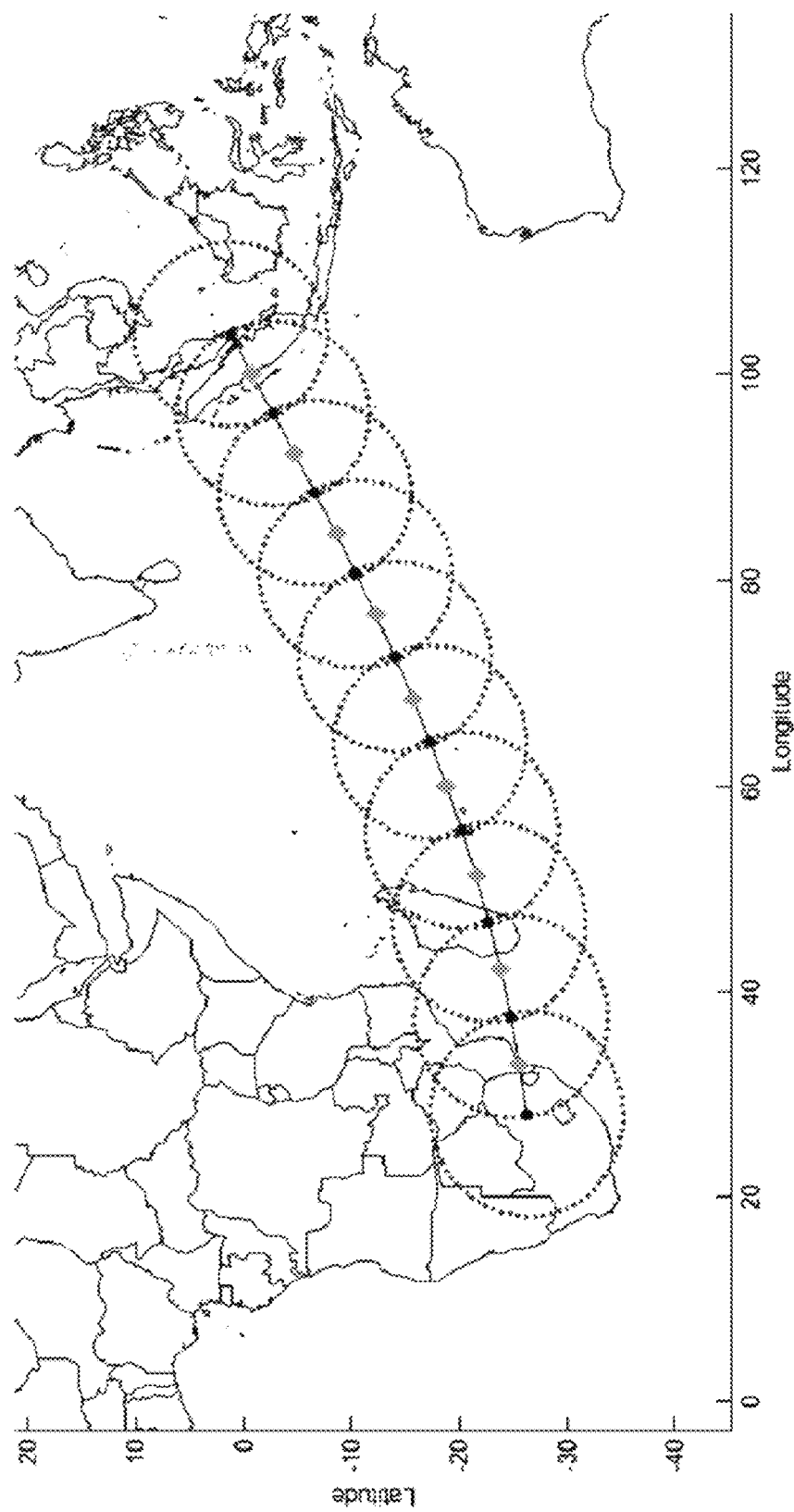

By arranging several stations placed on high-altitude stationary platforms and several relay stations in series, one succeeds in carrying out a transcontinental or transoceanic point-to-point communication link. FIG. 2 shows diagrammatically an exemplary communication link produced between Johannesburg and Singapore using 10 high-altitude platform stations and 9 relay stations at sea.

As indicated in the preamble, the optical links 101,102, 103 between two platforms may be blocked or attenuated by meteorological phenomena, notably clouds. To solve this problem, each station placed on a high-altitude stationary platform SHA_1,SHA_2 comprises a control facility configured to selectively activate the main link 101 between two stations placed on high-altitude platforms or a backup link 107,108 with a relay station REL placed on the ground or at sea. In the case where the backup link is activated, the repeater placed in the relay station REL retransmits the link received from a first station SHA_1 to a neighbouring second station SHA_2.

Likewise, the backup link 105,106 between a station SHA_1,SHA_2 and a terminal station ST_1,ST_2 is activated if the main link 102,103 has failed.

Figure 1B:
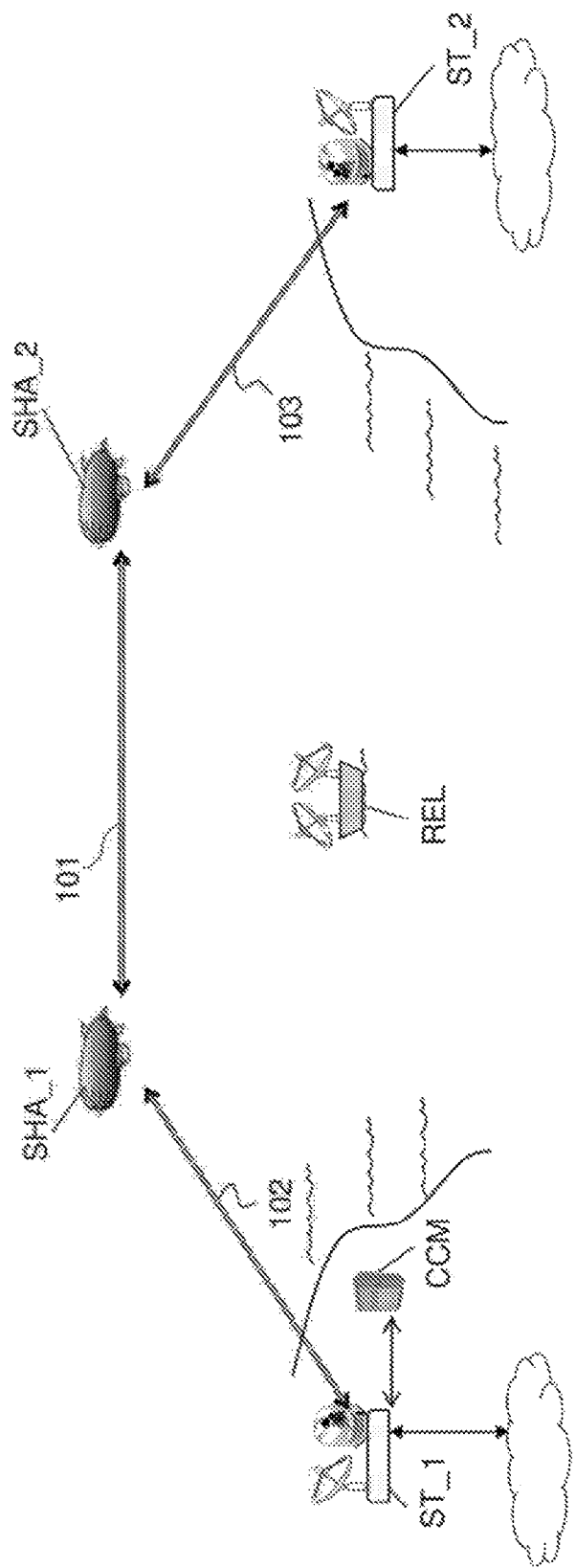
FIGS. 1B and 1C depict two other diagrams of the system of FIG. 1A in two different operating configurations, FIG. 2, an illustration of a communication link between two points of the Earth produced with the aid of a system according to the first embodiment of the invention, FIG. 3, a first diagram of an exemplary telecommunication system according to a second embodiment of the invention, FIG. 4, a second diagram of an exemplary telecommunication system according to the second embodiment of the invention, FIG. 5, a diagram illustrating the positioning of a relay station in relation to two high-altitude platforms, FIG. 6, a chart giving the distance between two high-altitude platforms as a function of the angle of elevation seen from the relay station.

FIG. 1B represents the system of FIG. 1A in the case where the optical main links 101,102,103 are in an operational state.

Figure 1C:
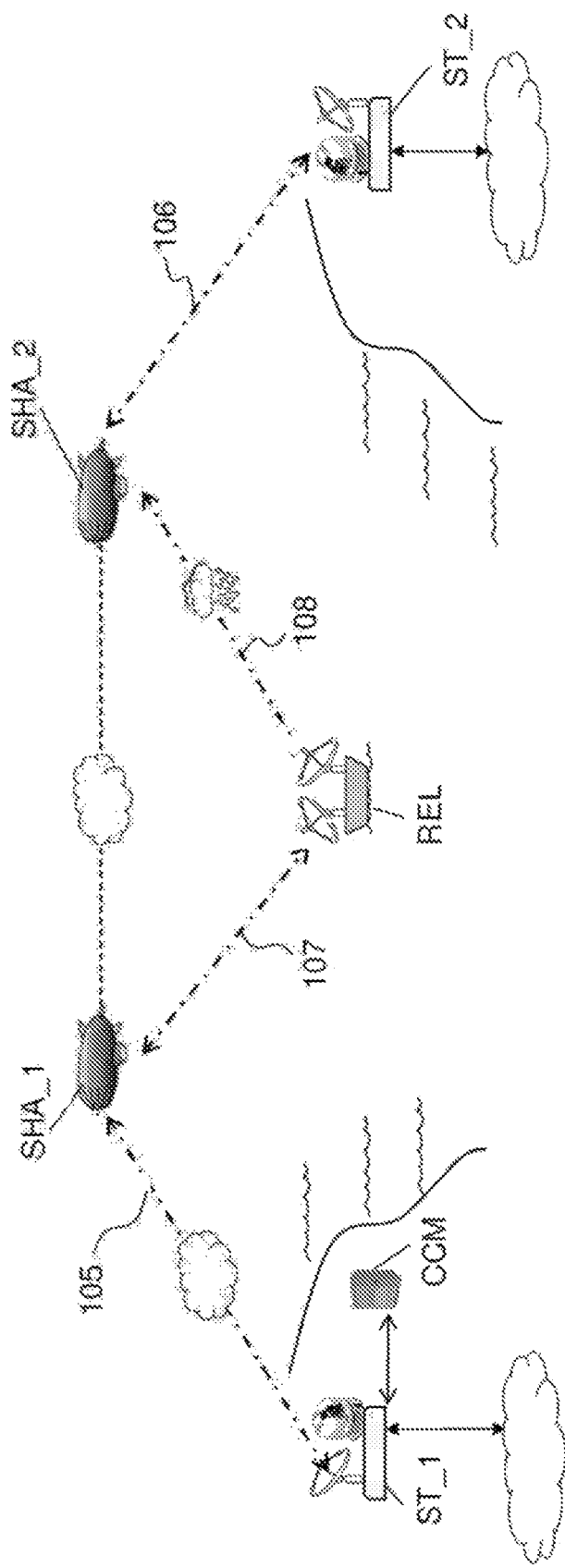

FIG. 1C represents the same system in the case where these main links 101,102,103 are blocked by clouds and where the backup links 105,107,108,106 are activated. Although in FIG. 1C, all the backup links are activated, the invention is not limited to this typical case and also covers the cases where at least one backup link is activated within the global system whilst other main links are maintained.

The selection of the main link or of the backup link is performed on the basis of an indicator of the operating state of the main link. This indicator can be obtained in several ways. It can be the result of a measurement of quality of the main communication linkup 101,104, for example a measurement carried out aboard the station SHA_1,SHA_2, either of the signal-to-noise ratio, or of the optical power of the received signal. This indicator can also be obtained by a device for detecting clouds, based on a camera and image processing software able to detect clouds between the platforms. It can also be determined a priori as a function of meteorological data and transmitted to each station SHA_1, SHA_2 by a command and control centre CCM.

The use of relay stations REL makes it possible to increase the distance between two high-altitude stationary platforms and ultimately to decrease their number so as to reduce the global production and deployment cost of the system.

Figure 3:
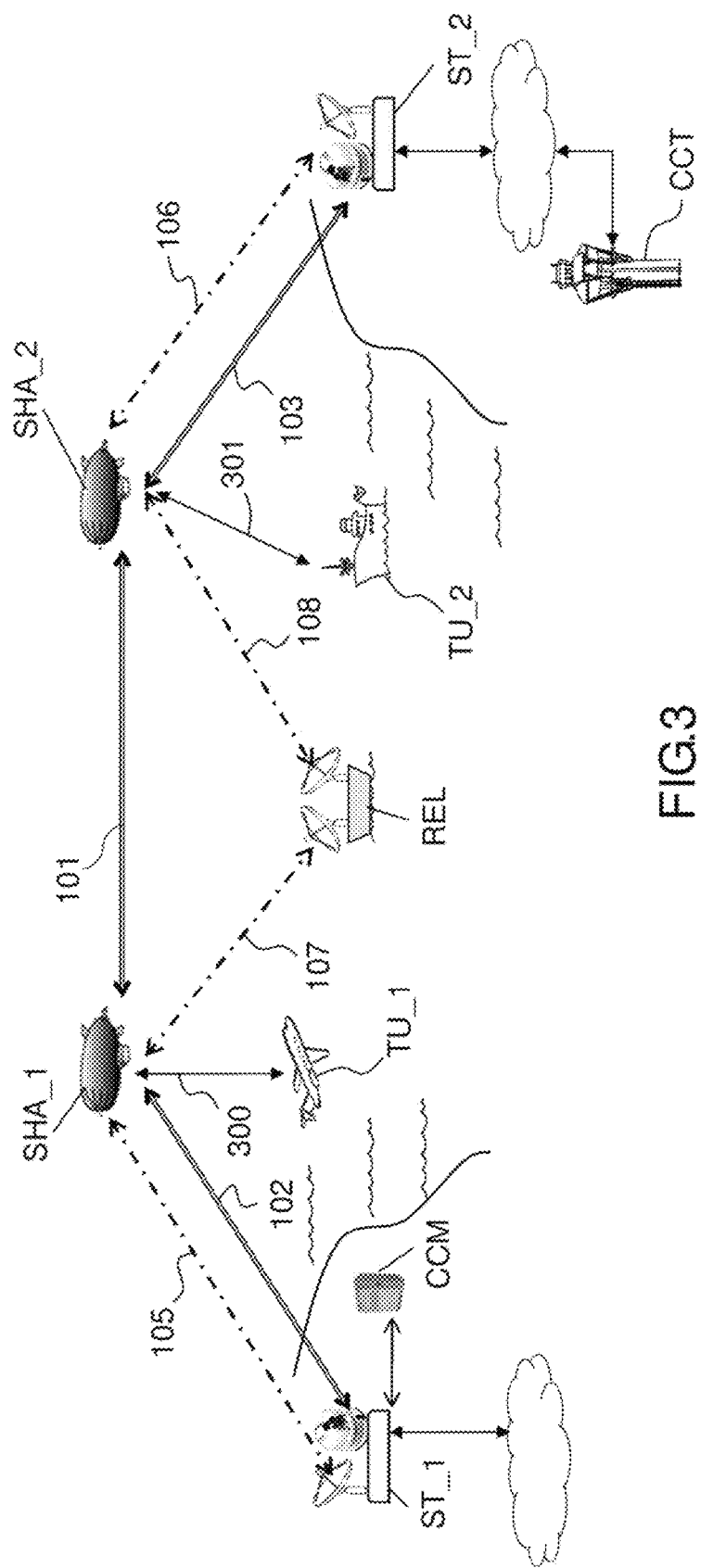

FIG. 3 represents a second embodiment of the system according to the invention.

In this second embodiment, the system is furthermore used to provide a contribution link, known as a "back-haul" link, to an aircraft surveillance system or a maritime surveillance system.

Accordingly, each station SHA_1,SHA_2 placed on high-altitude platforms is furthermore provided with means for establishing a communication link 300,301 with an aircraft TU_1 or a boat TU_2, for example a radiofrequency link in the VHF frequency band.

An aircraft surveillance system is, for example, a system of the "ADS-B" ("Automatic Dependent Surveillance Broadcast") type. In such a system, aircraft periodically emit messages to signal their position. These messages are picked up by a station SHA_1,SHA_2 by way of the radiofrequency communication link 300. They are thereafter transmitted to a terminal station ST_1,ST_2 which is linked to an air traffic control centre CTT by the Internet network or any other means of communication.

The same operation can be implemented for maritime surveillance for a system of "AIS" ("Automatic Identification System") type in which ships TU_2 emit identification messages comprising an identifier, their position and their course. These messages are picked up by a station SHA_1, SHA_2 close to the ship via the radiofrequency communication link 301.

Figure 4:
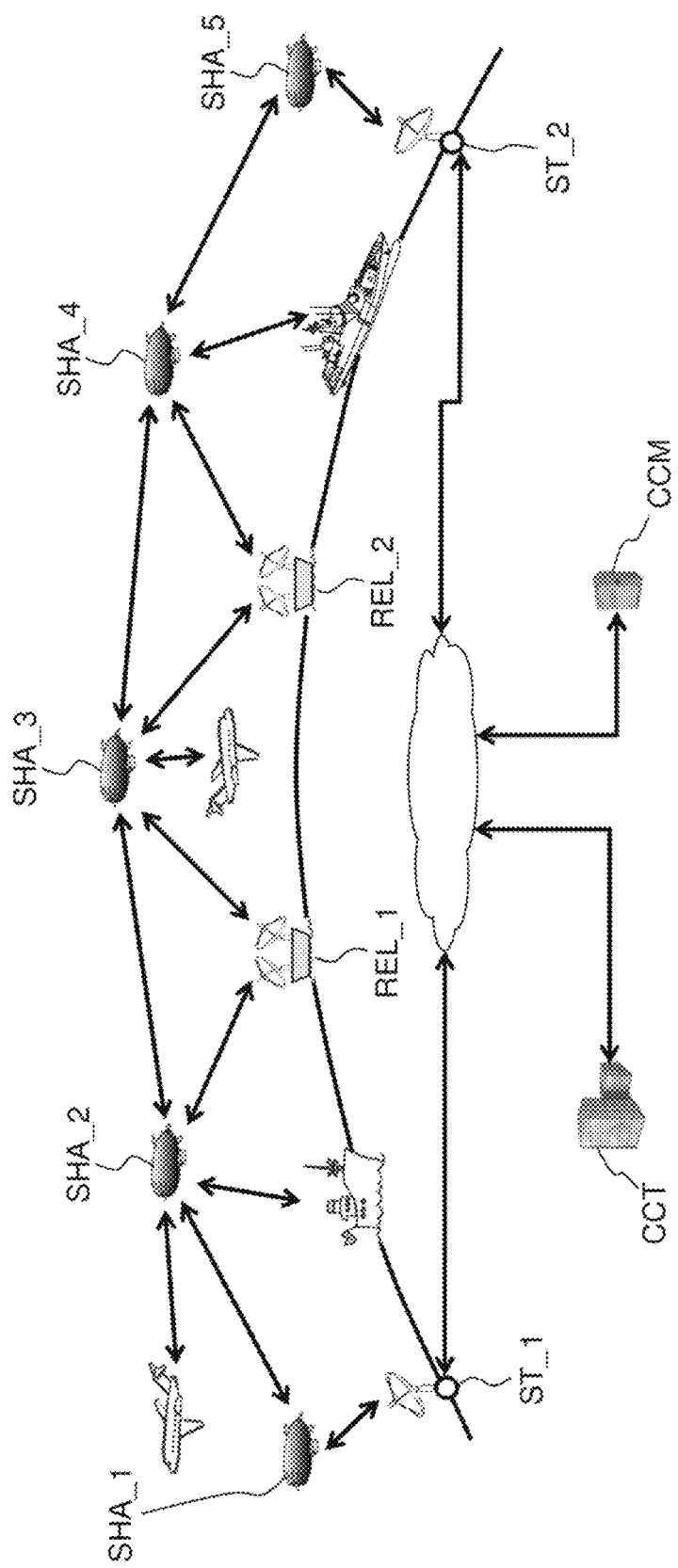

FIG. 4 shows diagrammatically another exemplary communication system combining one and the other of the embodiments of the invention, comprising, by way of non-limiting illustration, five stations placed on high-altitude platforms SHA_1,SHA_2,SHA_3,SHA_4,SHA_5 and two floating relay stations RE_1,RE_2 situated at sea.

In order to best optimize the number and distribution of the stations placed on high-altitude platforms and of the relay stations within the telecommunication system according to the invention, a particular method of deployment of the system is proposed.

Figure 5:
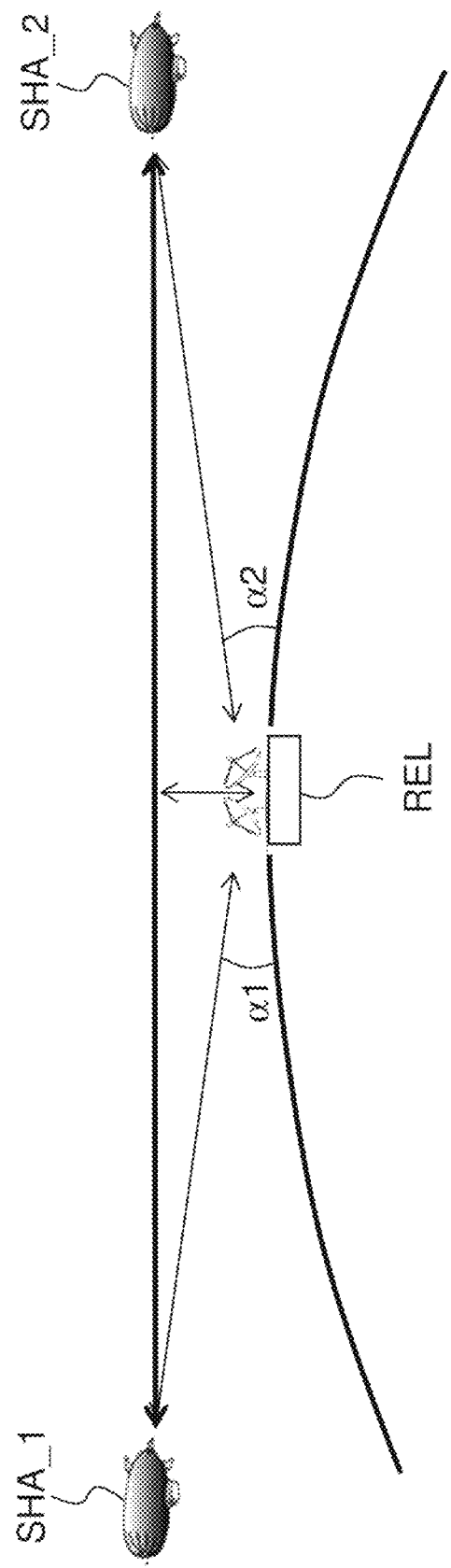

For each relay station positioned on the ground or at sea, an associated angle of elevation a is fixed as a function of the geographical environment of the relay station. The angle of elevation is the angle between the horizon and the straight line linking the relay station to a high-altitude platform station. This angle of elevation is illustrated in FIG. 5. For example, if obstacles are present around the relay, for example mountains, the angle of elevation is taken at a higher value than if the relay is situated at sea. For each relay disposed between two high-altitude platforms, two angles of elevation are defined.

Figure 6:
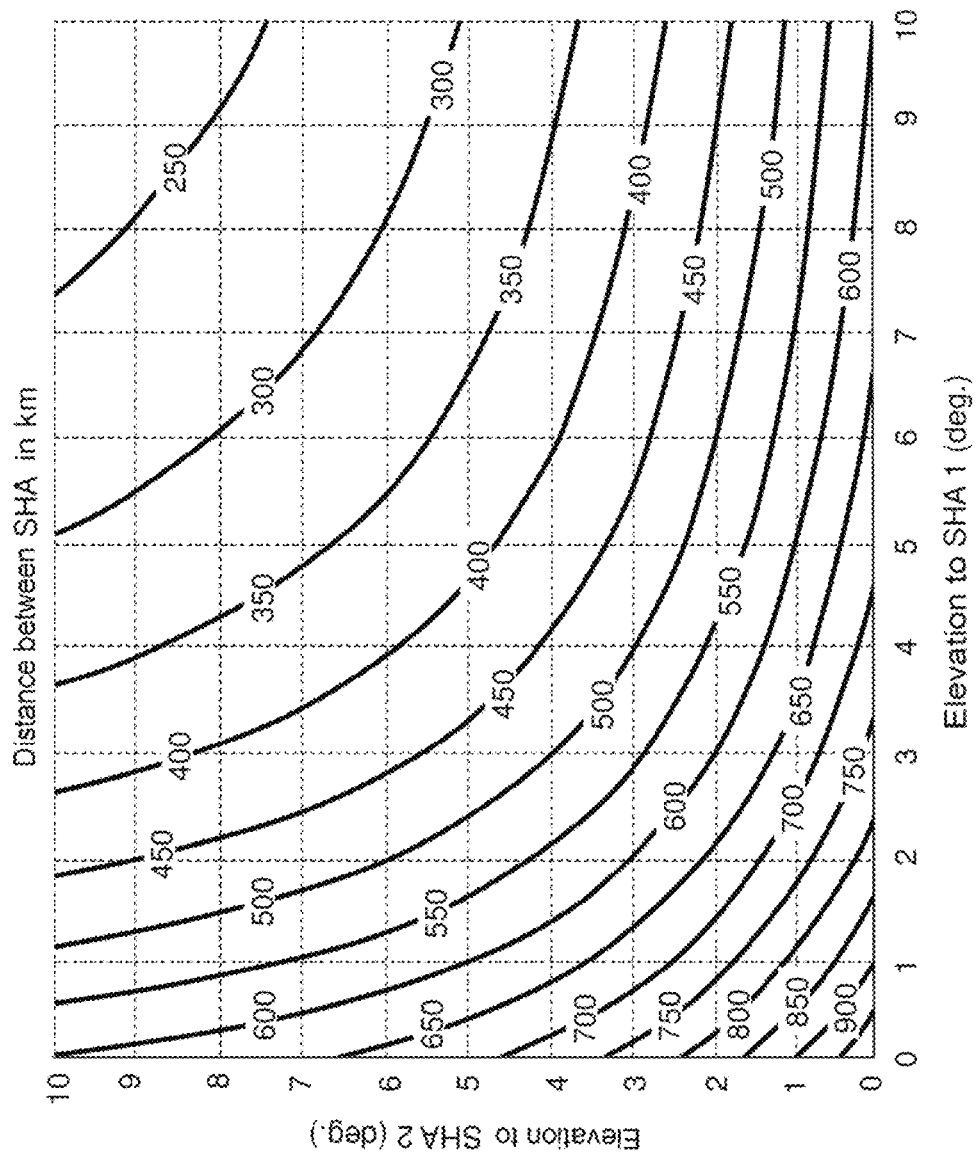

The chart of FIG. 6 thereafter gives the distance between two high-altitude platforms that must be complied with to obtain the two prescribed angles of elevation. Thus, it is possible to determine the distance between the pairwise neighbouring platforms and deduce therefrom the number of platforms and of relay stations to be used to produce a communication link having a given length.

Figure 7A:
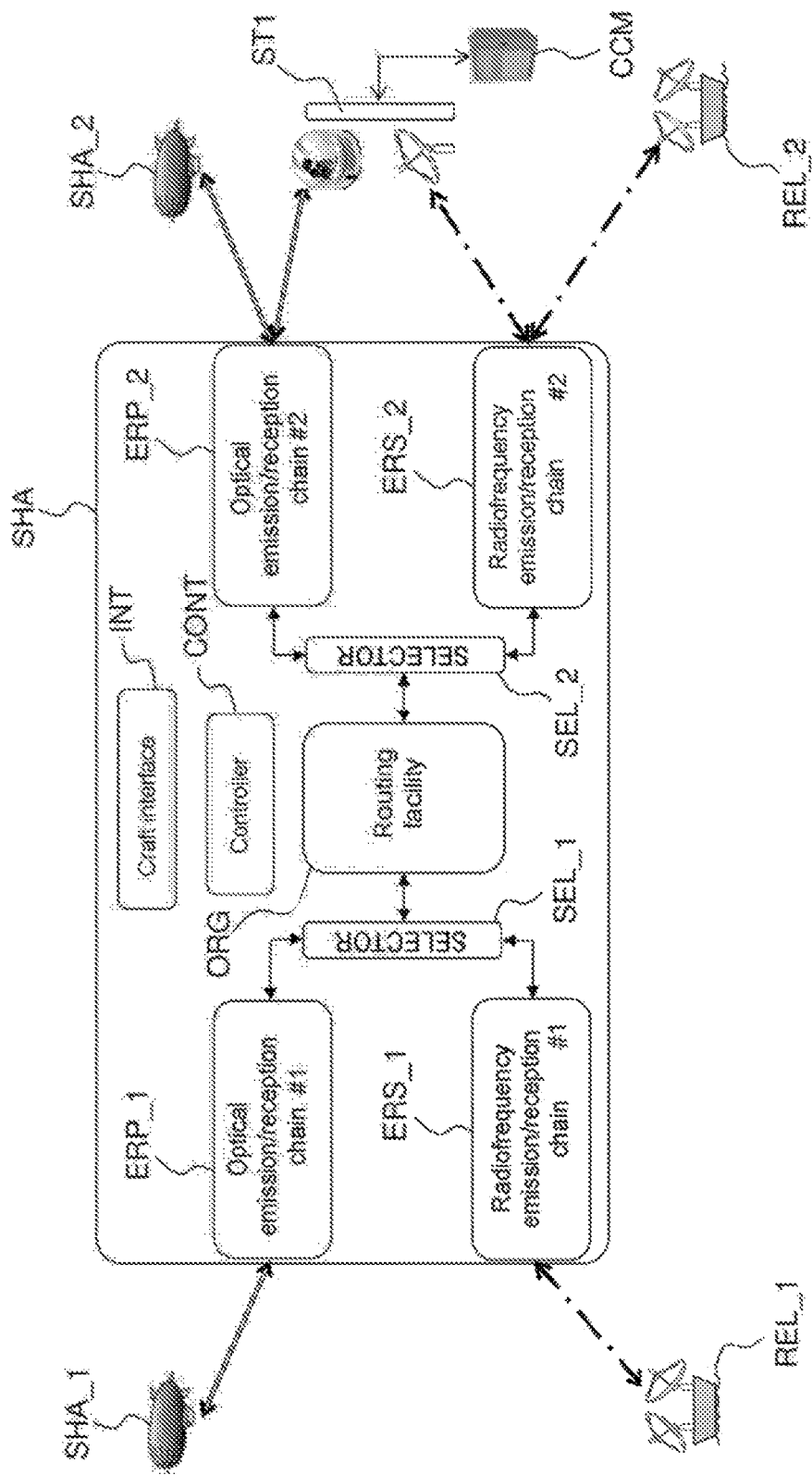
FIG. 7A depicts a schematic of a station placed on a high-altitude platform according to the first embodiment of the invention.

FIG. 7A describes an exemplary embodiment of a station SHA placed on a high-altitude platform according to the first embodiment of the invention. The station SHA is configured to communicate with other similar stations SHA_1,SHA_2, a terminal station ST_1 and at least one relay station REL_1,REL_2.

The station SHA comprises two emitter/receiver sets ERP_1,ERP_2 configured to establish an optical main communication link with another station SHA_1,SHA_2 placed on a high-altitude platform or with a terminal station ST_1. Each emitter/receiver set ERP_1,ERP_2 is configured to establish an optical link in free space or laser link. It comprises at least one modulator/demodulator and an optical terminal.

The station SHA furthermore comprises two emitter/receiver sets ERS_1,ERS_2 configured to establish a radiofrequency backup link with a relay station REL_1,REL_2 or a terminal station ST_1.

Each emitter/receiver set ERS_1,ERS_2 comprises at least one modulator/demodulator and an EHF-band radio transmitter comprising an antenna.

The station SHA furthermore comprises a command facility ORG and at least one selector SEL_1,SEL_2 configured to activate either the main communication link with a station SHA_1,SHA_2 placed in a high-altitude platform or a terminal station ST_1, or the backup link with a repeater placed in a relay station REL_1,REL_2 or a terminal station ST_1.

The command facility ORG is configured to select the main link or the backup link as a function of a state indicator of the main link. This indicator can be obtained on the basis of measurements on the signal received from the main link, for example measurements of signal-to-noise ratio or measurements of the optical power of the received signal. It can also be provided remotely by a control centre CCM as a function of the meteorological conditions in the environment close to the high-altitude platform. In the latter case, the indicator is received via an interface INT and a controller CONT which are moreover in charge of the general configuration of the station SHA.

Figure 7B:
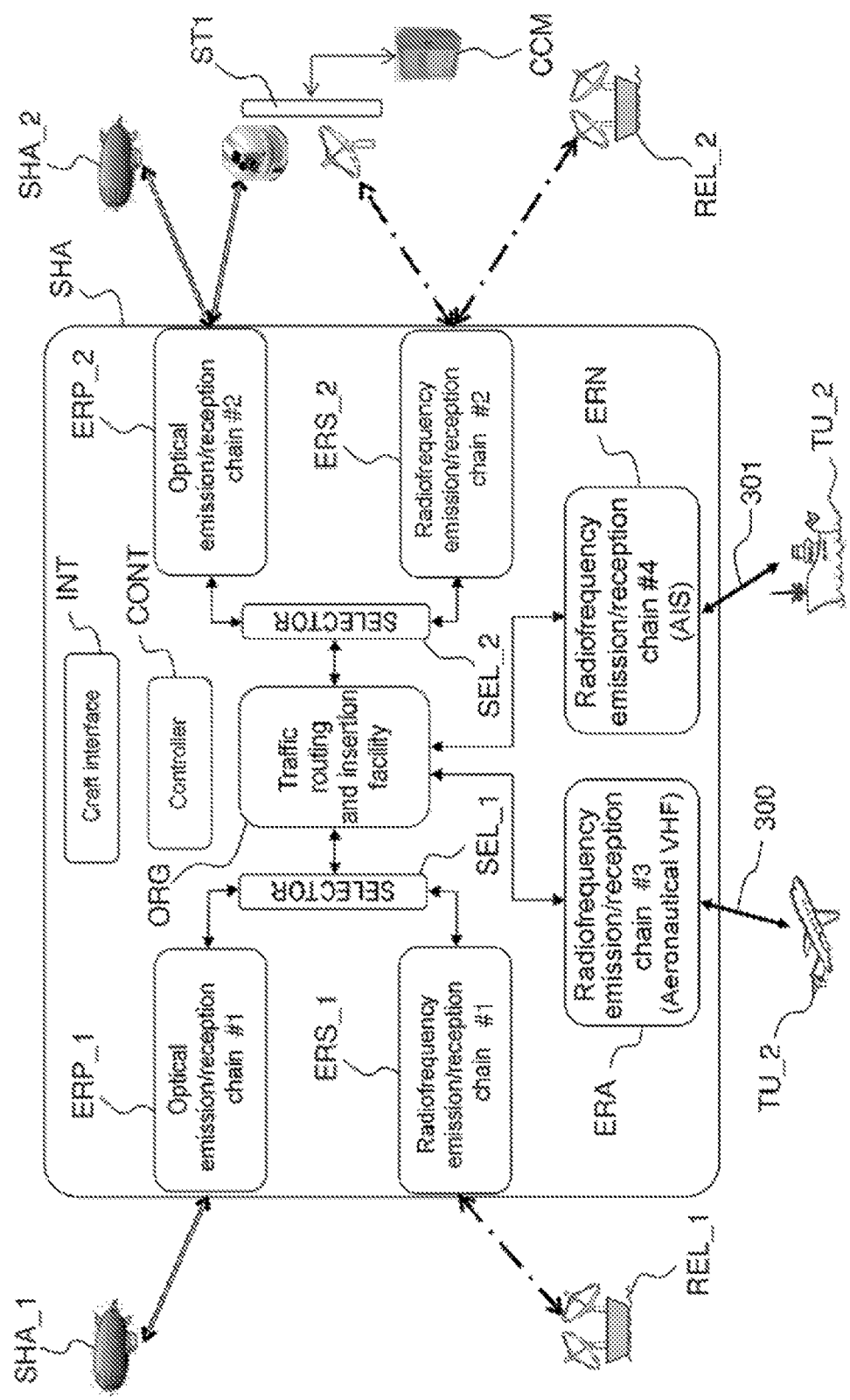
FIG. 7B depicts a schematic of a station placed on a high-altitude platform according to the second embodiment of the invention, FIG. 8, a schematic of a relay station and of its repeater, FIG. 9, a schematic of a terminal station.

In the second embodiment of the invention, the station SHA furthermore comprises, such as illustrated in FIG. 7B, at least one emitter/receiver set ERA_ERN for receiving identification messages originating from aircraft TU_1 or from ships TU_2. Each emitter/receiver set ERA_ERN comprises at least one processor, a modulator/demodulator and a radio receiver, for example in the VHF band. The processor is configured to extract the identification messages from the received signal and transmit them to the control facility ORG which is in charge of inserting these messages into the signal emitted on the main communication link with final destination a terminal station ST_1.

Figure 8:
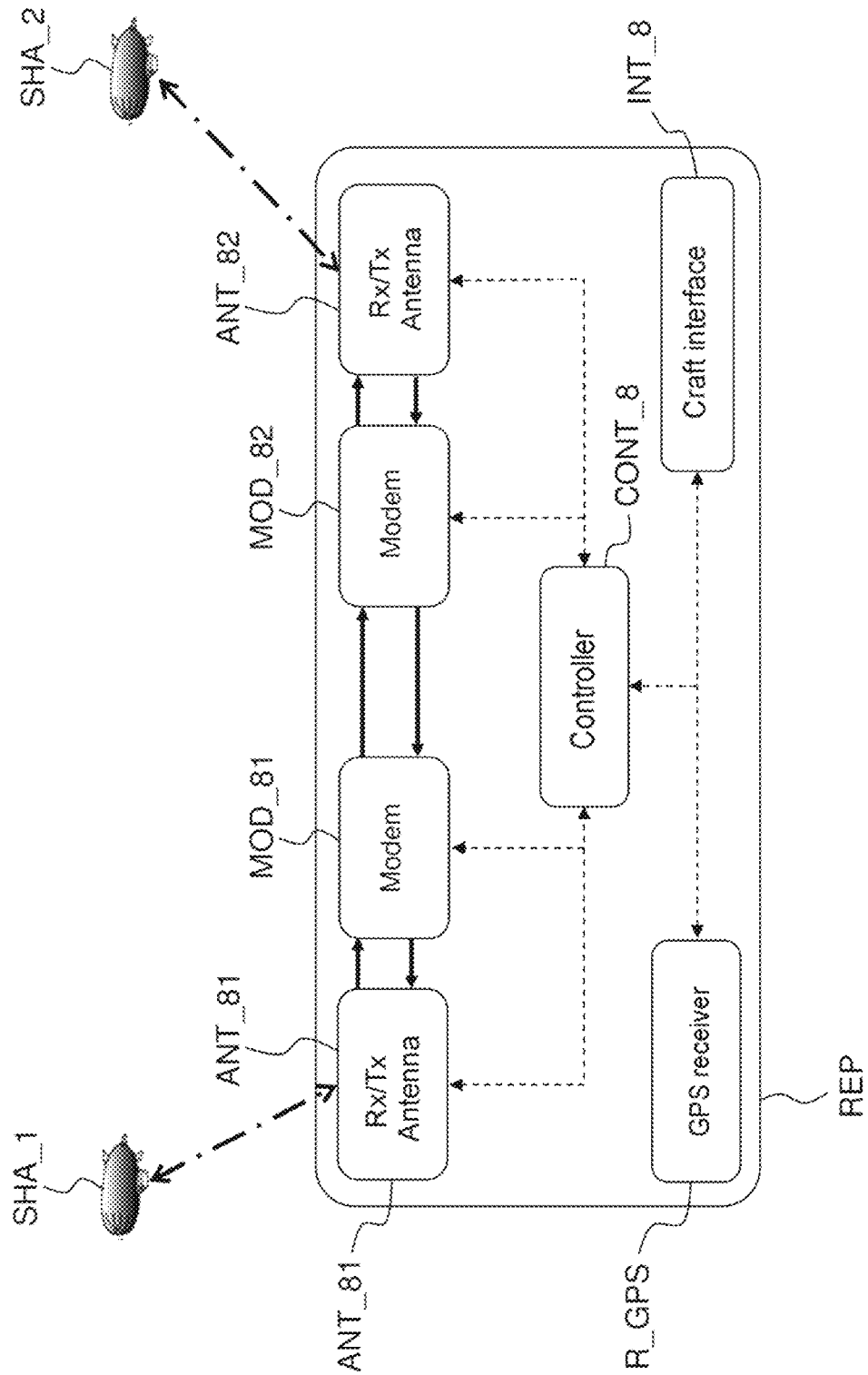

FIG. 8 describes an exemplary architecture of a repeater REP placed in a relay station. The repeater REP comprises at least one control facility CONT_8, an interface INT_8 and a GNSS receiver R_GPS. It furthermore comprises two emission/reception chains of a radiofrequency backup link, each comprising a modulator/demodulator MOD_81, MOD_82 and a, for example EHF-band, radio emitter/receiver, ANT_81,ANT_82 comprising an antenna. The repeater REP is thus configured to receive a signal originating from a first station SHA_1, demodulate it, then modulate it again and retransmit it to a second station SHA_2, doing so in both directions of communication.

Without departing from the scope of the invention, other implementations are possible for the repeater REP, notably a non-regenerative repeater which does not demodulate the signal received and retransmits it directly on the second link.

Figure 9:
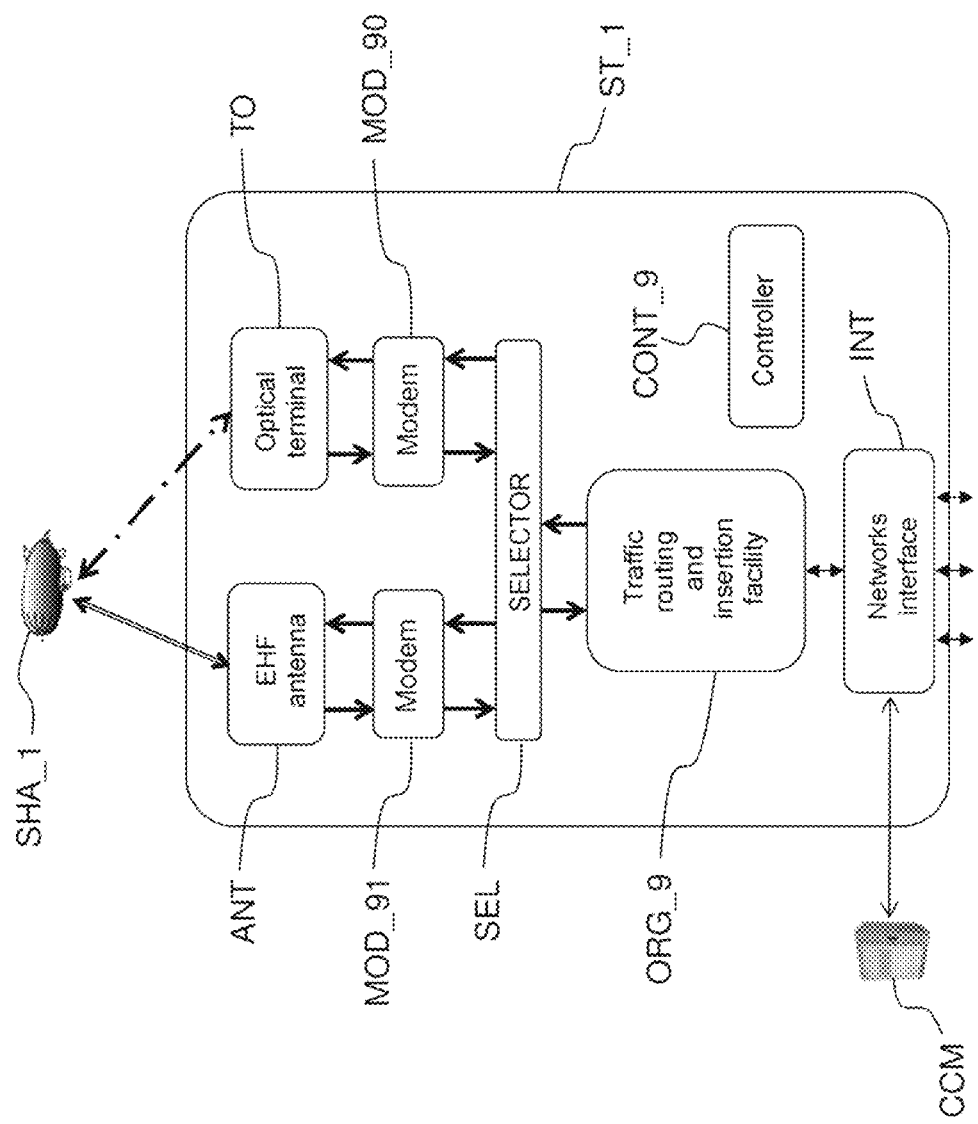

FIG. 9 describes an exemplary embodiment of a terminal station ST_1 which mainly comprises an optical main emission/reception chain and a radiofrequency backup emission/reception chain. The optical main emission/reception chain comprises an optical terminal TO and a modulator/demodulator MOD_90. The radiofrequency backup emission/reception chain comprises a radio emitter/receiver in the EHF band for example and a modulator/demodulator MOD_91.

The station ST_1 furthermore comprises a routing facility ORG_9, a controller CONT_9 and a network interface INT_9 for communicating with a command centre CCM.

The invention claimed is:

1. A station placed on a high-altitude stationary platform, comprising:
    two main emitter/receiver sets, at least one of the main emitter/receiver sets being configured to establish a main communication link with another station placed on a high-altitude stationary platform;
    two backup emitter/receiver sets, at least one of the backup emitter/receiver sets being configured to establish a backup communication link with a repeater placed on a relay station on the ground or at sea; and
    a control facility configured to selectively activate the main communication link or the backup communication link as a function of an indicator of an operating state of the main communication link, the indicator being based on meteorological conditions.

2. The station placed on the high-altitude stationary platform of claim 1, wherein the control facility comprises a device for measuring an indicator of the operating state of the main communication link and the station comprises a selection device configured to activate a backup communication link when the operating state of the main communication link is degraded.

3. The station placed on the high-altitude stationary platform of claim 1, wherein the main communication link is an optical link.

4. The station placed on the high-altitude stationary platform of claim 1, wherein the backup communication link is a radiofrequency link.

5. The station placed on the high-altitude stationary platform of claim 1, further comprising:
    at least one emitter/receiver set configured to establish a third communication link with an aircraft or a ship.

6. A system for telecommunications between a mutually remote first terminal station and a second terminal station, the system comprising at least two stations placed on high-altitude stationary platforms of claim 1, and
    wherein the system further comprises at least one repeater placed on a relay station on the ground or at sea and configured to relay the communications between two stations placed on high-altitude stationary platforms.

7. The telecommunications system of claim 6, wherein a distance between two high-altitude stationary platforms is determined based on two predetermined respective angles of elevation between the relay station and the two respective high-altitude stationary platforms, the angles of elevation being predetermined as a function of a geographical environment of the relay station.

8. The station placed on the high-altitude stationary platform of claim 1, wherein said platforms are aerostats.

9. The station placed on the high-altitude stationary platform of claim 1, wherein at least one of the main emitter/receiver sets is configured to establish a main communication link with a remote terminal station, and
    wherein at least one of the backup emitter/receiver sets is configured to establish a backup communication link with the remote terminal station.

* * * * *